United States Patent [19]

Hara

[11] Patent Number: 4,968,462
[45] Date of Patent: Nov. 6, 1990

[54] METHOD AND APPARATUS FOR SETTING INJECTION PRESSURE OF INJECTION MOLDING MACHINE

[75] Inventor: Hitoshi Hara, Tokyo, Japan

[73] Assignee: Sumitomo Heavy Industries, Ltd., Tokyo, Japan

[21] Appl. No.: 261,831

[22] PCT Filed: Jan. 29, 1988

[86] PCT No.: PCT/JP88/00072
§ 371 Date: Sep. 29, 1988
§ 102(e) Date: Sep. 29, 1988

[87] PCT Pub. No.: WO88/05721
PCT Pub. Date: Aug. 11, 1988

[30] Foreign Application Priority Data

Jan. 30, 1987 [JP] Japan .................. 62-18713

[51] Int. Cl.$^5$ ............................. B29C 45/77
[52] U.S. Cl. .................. 264/40.1; 264/40.5; 425/145; 425/149
[58] Field of Search ............ 264/40.1, 40.5, 40.7, 264/328.1; 425/135, 145, 146, 149, 166, 171; 364/476

[56] References Cited

U.S. PATENT DOCUMENTS

| | | | |
|---|---|---|---|
| 3,920,367 | 11/1975 | Ma et al. | 425/149 |
| 3,932,083 | 1/1976 | Boettner | 425/149 |
| 4,695,237 | 9/1987 | Inaba | 425/171 |
| 4,806,089 | 2/1989 | Neko | 425/145 |

FOREIGN PATENT DOCUMENTS 61-53020 3/1986 Japan .
06322 11/1986 PCT Int'l Appl. .

OTHER PUBLICATIONS

Middleman, Fundamentals of Polymer Processing, 1977, pp. 260–271.

Primary Examiner—Jill L. Heitbrink
Attorney, Agent, or Firm—Burns, Doane, Swecker & Mathis

[57] ABSTRACT

In a pressure setting method which is for use in an injection molding machine including a mold or a die, an injection section, and a control section and which is for setting and controlling a sequence of pressures for a sequence of steps from the start of injection of a resin to the die through a filling step to a holding step, pressure setting is carried out by sequentially setting the sequence of pressures described above in accordance with a time - injection pressure characteristic curve determined under the condition that a volume of the resin inside the die is substantially constant during the holding step and by locally modifying the holding step in the characteristic curve in correspondence with a molded product to be molded. The characteristic curve exhibits an exponential curve during the holding step while local modification is carried out pulsewise so that the characteristic curve becomes discontinuous. To this end, the pressure values can be set in correspondence with a shape and a thickness of the molded product. In order to obtain such pressure values, the control section comprises a function generator to which parameters for each step are supplied. The function generator is connected to a signal generator for supplying pulses.

6 Claims, 2 Drawing Sheets

METHOD AND APPARATUS FOR SETTING INJECTION PRESSURE OF INJECTION MOLDING MACHINE

TECHNICAL FIELD

The present invention relates to an injection pressure setting method and an injection molding machine.

BACKGROUND TECHNIQUE

In general, an injection molding machine comprises a mold or a die, an injection section for injecting a molten resin to the die, and a control section for controlling operation of the injection section. The control section controls a sequence of injection pressures and time durations for a sequence of steps from a filling step through a holding step with reference to various detection signals extracted from the injection section and set values.

Generally, control conditions at the control section widely differ dependent on shapes of molded products to be formed. Accordingly, it is the practice to individually determine set values supplied to the control section for each molded product. Particularly, setting of injection pressures and control of injection time durations at the control section must be precisely determined because they are significant elements which determine the quality and accuracy of the molded products.

Heretofore, in order to set injection pressures during each step of an injection process, a method is adopted which at first prepares a defined pattern of the injection pressures in correspondence with the molded product in careful consideration of a feature and a shape of a molded product as well as a characteristic of a resin and switches stepwise the injection pressures at predetermined time intervals according to the defined pattern.

It is to be noted here that the defined pattern of the injection pressures is determined by parameters such as a thickness of the molded product, a shape of the molded product, and a liquidity degree of a molten resin. For example, as the molded product becomes thicker and its shape becomes more complicated, a uniformity of the molded product can not be assured unless the defined pattern has more multiple stages, while sinks and burrs are susceptible to be formed. However, when the defined pattern has multiple stages, setting points are disadvantageously increased in number. In addition, there is another problem that much skill is required for accurate judgment of an optimum value to be set for each stage.

Moreover, when the defined pattern has multiple stages, overshoot occurs every time on transition between stages. Accordingly, discontinuous points appear in the injection pressure actually applied to the die. This results in a disadvantage of leakage of a resin already charged in the die. Although various methods are known for removing such discontinuous points, there remains a problem in practical use because a structure of the injection section or the control section becomes complicated with any of those methods.

On the other hand, in case when a molded product is of a simple shape or when a molten resin has a low liquidity, it is possible to assure a quality of the molded product without switching the multiple stages. However, various kinds of particular defined patterns must be prepared in correspondence with characteristics of various molded products. This results in insufficiency in general use. In addition, there is another disadvantage that a high technology is required to produce such defined patterns.

Taking the above-mentioned problems into consideration, it is an object of the present invention to provide an injection pressure setting method capable of readily preparing characteristics in correspondence with molded products.

It is another object of the present invention to provide an injection molding machine which can be generally used and which can readily control an injection pressure.

DISCLOSURE OF THE INVENTION

According to the present invention, there is provided an injection pressure setting method comprising the stage of sequentially setting, with reference to a predetermined time - injection pressure characteristic curve, a sequence of injection pressures for a sequence of steps from a filling step for filling or charging a molten resin from an injection section to a die through a holding step for holding the resin filled in the die, and the stage of partially modifying set values based on the time-injection pressure characteristic curve in correspondence with a molded product to be injection-molded, wherein the time-injection pressure characteristic curve is determined under the condition that a volume of the resin inside the die is constant during the holding step.

According to the present invention, there is also provided an injection molding machine comprising a die, an injection section for injecting a resin to the die, waveform generating means for generating, with reference to a predetermined time - injection pressure characteristic curve, an electric signal representative of a sequence of injection pressures for a sequence of steps from injecting and filling the resin from the injection section into the die through holding, and a control unit responsive to the electric signal for controlling the pressures at the injection section.

PRINCIPLE OF THE INVENTION

Next, a principle of the present invention will be described in order to facilitate the understanding of the present invention. At the outset, description will be made as regards a time - injection pressure characteristic curve which defines a sequence of injection pressures for a sequence of steps from a filling step for filling a resin from an injection section to a die through a holding step for holding the resin filled in the die.

In general, a time - injection pressure characteristic curve is illustrated on a coordinate comprising an abscissa and an ordinate which represent a time and an injection pressure, respectively, and shows an injection pressure defined pattern corresponding to a type of a molded product. The time - injection pressure characteristic curve consists of a part corresponding to a filling step and another part corresponding to a holding step. The quality of the molded product is affected mostly by a gradient of the curve at the part corresponding to the holding step.

Figure 1:
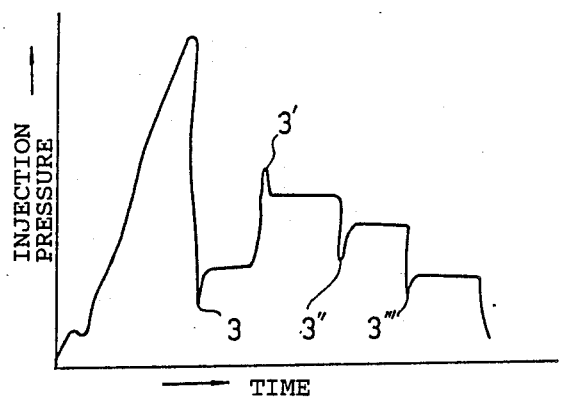
FIG. 1 is a graph for describing a conventional injection pressure setting method.

Referring to FIG. 1, the gradient at the holding step has heretofore been determined by multiple stage setting, as illustrated in FIG. 1. Specifically, use has been made of a method of dividing the holding step into multiple stages, individually setting a holding pressure for each stage, and successively switching the holding pressures on every stage. In this event, overshoots 3, 3', and 3" occur every time on switching the holding pressures so that the aforementioned problem arises.

The present inventor found out that it is possible to provide a molded product of a best quality by setting holding pressures according to an exponential curve without relying upon multiple stage setting.

Practically, a following equation is used for representing how long it takes in second before the molded product is cooled to a temperature at which the molded product becomes separable from the die when the die is kept at a predetermined temperature.

$$t_0 = \frac{d^2}{\pi^2 \alpha} \cdot \log_e \left[ \frac{\pi}{4} \left( \frac{Tx - Tm}{Tc - Tm} \right) \right] \quad (1)$$

$t_0$: a minimum time duration required for cooling (sec)
$\alpha$: a heat radiation rate of a molten resin
d: a thickness of a molded product ($1 \times 10^{-3}$ inch)
Tx: a heat transformation temperature of a molten resin (°C.)
Tc: an injection temperature of a molten resin (°C.)
Tm: a die temperature (°C.)

In the meanwhile, when the injecting operation to the die is completed and the resin is stopped to flow, a molten resin is affected by the temperature Tm at the inside of the die (hereinafter called a cavity) and a filling step pressure P to be put in the condition represented by the Van der Waals' equation:

$$(P + \tau) \cdot (V - w) = RTm \quad (2)$$

V: a cavity volume
$\tau$, W, R: constants

Here, it was confirmed by experiments that, when the cavity volume V is kept constant, a molded product of a high quality is obtained with little sinks or burrs and this method is remarkably effective.

In order to keep the cavity volume V constant, the following formula must be approximately established from the above-mentioned equation (2):

$$V \approx \frac{Tm}{P} \quad (3)$$

It is to be noted here that the cavity temperature Tm is lowered with time according to the exponential curve after the molten resin is filled to the substantially full extent, as is understood from the above-mentioned equation (1). Substituting this relationship into the above-mentioned formula (3), it is seen that the holding pressure P should also be reduced according to the exponential curve in order to keep the cavity volume V constant.

As described above, the holding pressure reduction gradient is defined by the exponential curve. However, there may be a case where an improved quality of a molded product can not be accomplished even by the use of the exponential curve, when burrs are formed immediately after injecting operation because of a shape of the molded product or poor solidity of the die. In that case, the exponential curve is partially cut pulsewise to locally reduce the injection pressure until a solidified layer is formed on a surface of the resin. Thus, it was found out that the injection pressure can precisely be set by forming a time - injection pressure characteristic curve in correspondence with a type of the molded product.

The Best Mode for Embodying the Invention

Description will now be made as regards an injection molding machine according to one embodiment of the present invention with reference to the drawing.

Figure 2:
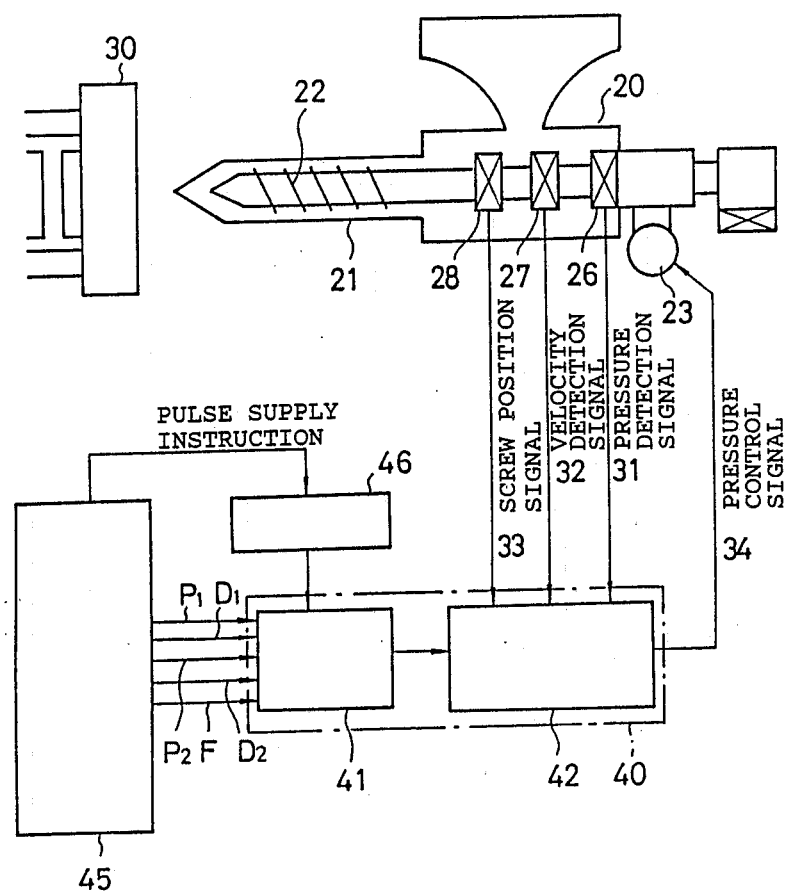
FIG. 2 is a block diagram for describing an injection molding machine according to one embodiment of the present invention.

An injection molding machine illustrated in FIG. 2 comprises a die 30, an injection section 20 for injecting a molten resin to the die 30, and a control section 40 for controlling the injection section 20. The illustrated injection section 20 comprises a cylinder 21 provided with a hopper, a screw ram 22 shuttling within the cylinder 21 in a transversal direction in the figure, and a driving section 23 such as a hydraulic pump for driving the screw ram. In the cylinder 21, a pressure detector 26 for detecting a pressure inside the cylinder 21, a velocity detector 27 for detecting a velocity of the screw ram 22, and a position detector 28 for detecting a position of the screw ram 22 are respectively equipped in a known manner.

The pressure detector 26, the velocity detector 27, and the position detector 28 supply the control section 40 with a pressure detection signal 31, a velocity detection signal 32, and a position detection signal 33, respectively.

The control section 40 comprises a function generator 41 for producing a defined injection pattern for a sequence of steps from the start of a filling step through the completion of a holding step in accordance with parameters which will later be described, and a control unit 42 responsive to the pressure detection signal 31, the velocity detection signal 32, and the screw position detection signal 33 for supplying a pressure control signal 34 to the driving section 23. The function generator 41 is usually made of a general purpose microprocessor but may be a hardware logical circuit containing a semiconductor circuit which produces an output signal of a variable amplitude and a variable phase in accordance with parameters supplied as input signals.

Figure 3:
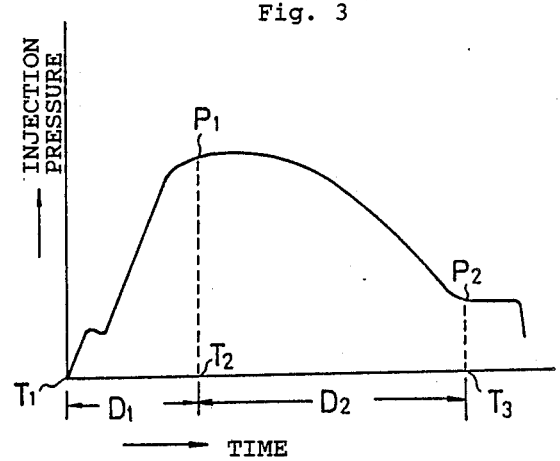
FIG. 3 is a graph for describing an injection pressure setting method carried out by the injection molding machine illustrated in FIG. 2.

Referring to FIGS. 2 and 3, the function generator 41 illustrated in FIG. 2 generates a function which determines a pattern for realizing a time-injection pressure characteristic curve shown in FIG. 3. Specifically, the time - injection pressure characteristic curve shown in FIG. 3 can be divided into a filling step defined by a filling start time instant T1 at which the molten resin is started to be filled in the die and a filling completion time instant T2, and a holding step which is carried out following the filling step. The holding step is defined by a final holding time instant T3. The illustrated time-injection pressure characteristic curve reaches a filling step pressure P1 and a final holding pressure P2 at the filling completion time instant and the final holding time instant T3, respectively.

The function generator 41 in FIG. 2 is formed so as to vary a time duration D1 of the filling step, a time duration D2 of the holding step, the filling step pressure P1, and the final holding pressure P2 in the time-injection pressure characteristic curve illustrated in FIG. 3. The function generator 41 is formed so as to vary the injection pressure during the holding step in accordance with the exponential curve described above. Thus, the function generator 41 supplies the control unit 42 with an electric signal which determined the time-injection pressure characteristic curve.

In addition, the illustrated function generator 41 also produces a function for the filling step. However, the function for the filling step may be produced by another additional function generator.

In order to supply the above-mentioned parameters, the illustrated function generator 41 is connected to an input device 45. The input device 45 supplies the function generator 41 with the filling step pressure P1, the filling step time duration D1, the final holding pressure P2, the holding step time duration D2, and constants required for the equation (1).

Furthermore, the illustrated input device 45 supplies pulse supply instruction to a signal generator 46. According to the instruction, the signal generator 46 delivers to the function generator 41 a pulse having the width and the amplitude determined by the instruction. To this end, it is possible to discontinuously vary the time-injection pressure characteristic curve produced by the function generator 41.

Figure 4:
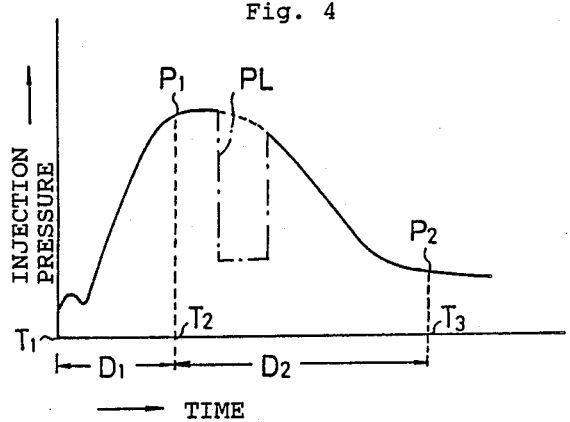
FIG. 4 is a graph for describing another injection pressure setting method according to the present invention.

Referring to FIG. 4, a pulse PL is supplied from the signal generator 46 during the holding step time duration D2 to locally cut a part of the time-injection pressure characteristic curve. Thus, it is possible to obtain the holding condition corresponding to the molded product by locally cutting a part of the time-injection pressure characteristic curve.

The pulse PL may be made to have a constant pulse width while a pulse amplitude is rendered variable. Alternatively, the pulse amplitude may be kept constant while the pulse width is rendered variable. Dependent on a condition, both of the width and the amplitude of the pulse may be varied.

Now, description will proceed to an embodiment of an injection setting method according to the present invention and operation thereof. At the outset, molded products to be molded by an injection molding machine can be classified into ones having a complicated shape and others having a simple shape. When the molded product is of a complicated shape, the resin is required to have a high liquidity. Accordingly, the molded product of a complicated shape is liable to be accompanied with burrs. On the other hand, the resin is allowed to have low liquidity when the molded product has a simple shape. Accordingly, the molded product of a simple shape seldom has burrs. In view of the above, it is necessary to change a molding condition in dependence on a shape of the molded product.

In the meanwhile, the molded products are made either by thin-molding or by thick-molding. In case of the thin-molding, the shape is almost completed by an initial filling energy. On the other hand, in case of the thick-molding, the shape is determined by a supplemental energy which is applied after the resin is filled in the die, in other words, after the filling step.

Accordingly, in the embodiment of the present invention, judgment is at first made as to whether or not a shape of the molded product is complicated. When the shape is complicated, it is necessary to prevent occurrence of burrs. In this event, a part of the time-injection pressure characteristic curve is cut as illustrated in FIG. 4. This means that the inertial advance power of a screw is weakened by locally reducing the pressure during the holding step. By locally reducing the pressure during the holding step as described above, a solidified layer is formed on a surface of the resin in the die within the period when the pressure is reduced. In this event, occurrence of burrs in the molded product is avoided even if the resin of a high liquidity is used. Generally, the period when the pressure is reduced may be as short as 0.05 second to 0.3 second.

On the other hand, when the molded product of a simple shape is to be molded, it is unnecessary to partially cut the time - injection pressure characteristic curve. In this event, the electric signal from the function generator 41 is delivered to the control unit 42 without being modified by the output of the signal generator 46.

Then, judgment is made as to whether the molded product is thin or thick. In case of a thin product, the holding step time duration D2 is shortened and, correspondingly, the screw ram 22 is moved at a high speed while the final holding pressure P2 is set with a low value. When a result of the judgment shows that the molded product is thick, the holding step time duration D2 is lengthened and the final holding pressure P2 is set with a high value. To this end, the supplemental energy required for the thick product can be obtained.

The above-mentioned result of the judgment is supplied as a parameter from the input device 45 to the function generator 41 and the signal generator 46. The function generator 41 supplies the control unit 42 with the time-injection pressure characteristic corresponding to the molded product.

The control unit 42 supplies the driving section 23 with the pressure control signal 34 in accordance with the time - injection pressure characteristic corresponding to the molded product, with reference to the pressure detection signal 31, the velocity detection signal 32, and the position detection signal 33. The detection signals supplied to the control unit may be extracted from the die 30.

According to the present invention, there is an advantage that an injection pressure can readily and precisely be set according to elements which can be objectively judged as numerical values before molding.

Probability of Industrial Utilization:

A pressure setting method according to the present invention is applicable not only to an injection molding machine using a hydraulic motor but also to an injection molding machine of an electric motor drive type.

I claim:

1. An injection molding method of manufacturing a molded product by an injection molding machine through a sequence of steps, said steps being successively carried out in the order of an injecting step of injecting resin toward die, a filling step of filling said die with said resin, and a holding step of holding said resin in said die, said injection molding method further comprising the steps of:

selecting a predetermined time-injection pressure characteristic curve which is variable with time and which is specified by an exponential curve during said holiday step;

determining, on the basis of said predetermined time-injection pressure characteristic curve, pressures from said injection step to said holding step; and successively controlling the respective steps by said pressures determined on the basis of said predetermined time-injection pressure characteristic curve to manufacture said molded product, said holding step being thereby controlled in accordance with said exponential curve.

2. An injection molding method as claimed in claim 1, further comprising the step of:

partially modifying the pressure determined on the basis of said exponential curve during said holding step.

3. An injection molding method as claimed in claim 2, wherein said modifying step is carried out during said holding step by changing the pressures determined on the basis of said exponential curve.

4. An injection molding method as claimed in claim 3, wherein said pressures are modified so that said exponential curve becomes discontinuous during said holding step.

5. An injection molding machine which comprises a die, an injection section for injecting a resin to said die, and a control section for controlling said injection section to mold a desired molded product by injecting the resin to said die, said injection molding machine successively carrying out an injection molding operation in the order of an injection step of injecting resin toward said die, a filling step of filling said die with said resin, and a holding step of holding said resin in said die, wherein said control section comprises:

generating means for generating a sequence of pressures which are determined for the injection step, the filling step, and the holding step on the basis of a predetermined time-injection pressure characteristic curve which is variable with time and which is specified in part by an exponential curve, said holding step being controlled in accordance with said exponential curve;

parameter input means for supplying parameters for said time-injection pressure characteristic curve to make said generating means sequentially produce pressure values based on said time-injection pressure characteristic curve and said parameters; and a control unit coupled to said generating means for controlling an injection pressure at said injection section in accordance with said pressure values sent from said generating means.

6. An injection molding machine as claimed in claim 5, wherein said parameter input means comprises:

means for supplying a function value on said time-injection pressure characteristic curve; and means for supplying a modified pressure value so a to discontinuously vary said exponential curve of the time-injection pressure characteristic curve during said holding step.

* * * * *